Figure 1:
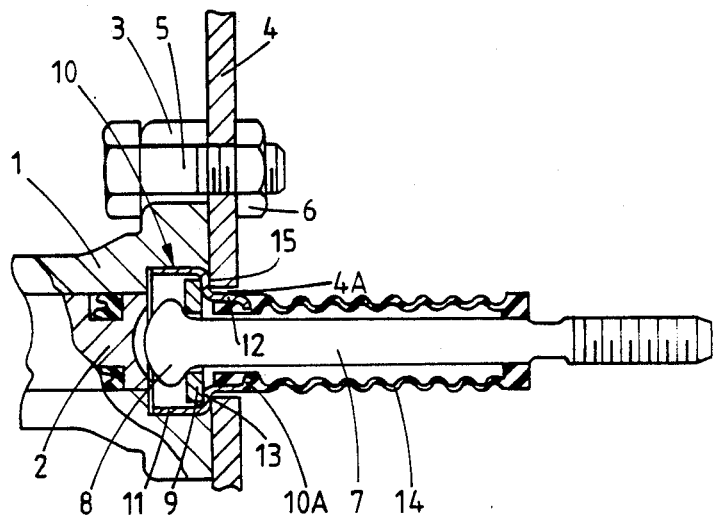

United States Patent [19]

Campbell et al.

[11] Patent Number: 4,884,494
[45] Date of Patent: Dec. 5, 1989

[54] PRESSURE CYLINDER

[75] Inventors: Roy Campbell, Worcestershire; Anthony G. Price, Gwent, both of Great Britain

[73] Assignee: Lucas Industries Public Limited Company, Birmingham, England

[21] Appl. No.: 163,034

[22] Filed: Mar. 2, 1988

[30] Foreign Application Priority Data

Mar. 3, 1987 [GB] United Kingdom ............... 8704899

[51] Int. Cl.$^4$ .......................... F16J 1/10; F01B 11/02
[52] U.S. Cl. ........................................ 92/129; 92/161; 92/169.1; 92/171.1; 411/512; 411/517; 60/533
[58] Field of Search .................... 60/533; 92/146, 129, 92/161, 165 R, 169.1, 171, 128, 150, 151; 411/516, 517, 520, 910, 112, 113, 512

[56] References Cited

U.S. PATENT DOCUMENTS

| | | | |
|---|---|---|---|
| 3,156,097 | 11/1964 | Brown | 92/169 |
| 3,266,383 | 8/1966 | Cairns | 92/142 |
| 4,495,772 | 1/1985 | Furtura et al. | 92/171 |
| 4,505,112 | 3/1985 | Nakamura | 60/533 |
| 4,510,752 | 4/1985 | Gaiser | 92/171 |
| 4,671,065 | 6/1987 | Ishiwata | 60/533 |
| 4,685,301 | 8/1987 | Bacardit et al. | 92/169 |

FOREIGN PATENT DOCUMENTS

| | | | |
|---|---|---|---|
| 48208 | 8/1982 | European Pat. Off. | 92/128 |
| 1083148 | 1/1955 | France | 60/54.6 |
| 1481612 | 8/1977 | United Kingdom | 92/171 |

Primary Examiner—Robert E. Garrett
Assistant Examiner—Thomas Denion
Attorney, Agent, or Firm—Fleit, Jacobson, Cohn, Price, Holman & Stern

[57] ABSTRACT

A pressure cylinder has a piston actuated by a force-input rod. An enlarged head of the rod is engaged by a washer and the assembly retained within the cylinder by a cup-shaped retainer press-fitted into the cylinder open end. An outer surface of the retainer is flush with the adjacent axially outermost surface of the cylinder and engages a support, to which the cylinder is fixed, in order to transmit to the support retraction forces sustained by the rod.

9 Claims, 1 Drawing Sheet

4,884,494

PRESSURE CYLINDER

This invention relates to a pressure cylinder within which pressure is generated by movement of a piston under the action of a force input rod, such a cylinder being primarily useful as a master cylinder for actuating a vehicle brake or clutch hydraulic system.

The force input rod in such a cylinder can be required to sustain significant loads arising principally from an external return spring normally associated with a driver-operated pedal from which actuating force is applied to the rod. Additional force can arise from one or more piston return springs acting within the cylinder. In some conventional arrangements, such return spring loads are reacted against a circlip or similar device engaged, for example, in a groove formed in the cylinder internal wall and whilst this arrangement is generally satisfactory in use, the machining of the cylinder groove and provision of a relatively substantial circlip, usually of spring steel, adds significantly to the manufacturing costs of the cylinder.

An object of the invention is to provide a pressure cylinder incorporating an improved rod retention means of simple and convenient form.

According to the invention, a pressure cylinder comprises a cylinder body containing a piston movable in one direction by a generally co-axial force input rod, and rod retention means carried by the cylinder and presenting an outwardly facing surface so arranged that, when the cylinder is mounted on a fixed support, said surface faces a surface of the support, whereby forces sustained, in use, by the rod in a direction opposed to the actuating force input direction are reacted via said retention means on the fixed support.

Preferably, the retention means has a first cylindrical portion engaged within an open end of the cylinder, and a second portion of reduced diameter projecting axially outwardly of the cylinder and extending, in use, through an opening in said support, a shoulder between said portions providing said surface of the retention means.

Said second portion may conveniently be fixed to a protective boot for the rod, said boot preferably being moulded on to said second portion. By this means, the need for a separate boot retention means is avoided.

Figure 2:
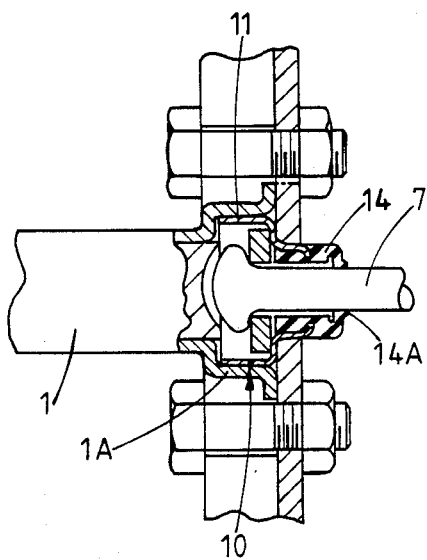

The invention will now be described, by way of example, with reference to the accompanying drawings in which:

FIG. 1 is a fragmentary view, partly in cross-section of part of one form of the pressure cylinder of the invention, and FIG. 2 is a view similar to FIG. 1 illustrating part of an alternative embodiment of the cylinder of the invention.

Referring to FIG. 1, this shows part of a master cylinder having a cast cylinder body 1 containing a piston, part of which is shown at 2, the cylinder having a radial flange 3 serving to mount the cylinder on a fixed support 4, such as a vehicle bulkhead, for example. The cylinder is secured in position by bolts, one of which is seen at 5, passing through the flange and support and engaged by nuts 6.

The piston is actuated by a force input rod 7 provided with an enlarged head 8 which engages a retaining washer 9, itself contained within a retention device in the form of a cup 10 which has a cylindrical portion 11 press-fitted into the open end of the cylinder and surrounding the washer 9. A further smaller diameter cylindrical portion 12 of the device 10 is joined to the portion 11 by a radially directed portion 13 which lies behind and retains the washer 9. The portion 12 is secured to a boot 14 surrounding the rod 7 to prevent the ingress of foreign material along the rod 7. The boot may be moulded on to the cylindrical part 12 of the retention device 10 so as to form a permanent assembly therewith. A portion 10A of the retainer is bent radially inwardly and serves to key the device 10 to the boot. The outwardly facing radial surface 15 of the device 10 is arranged to be flush with the axially outer surface of the support flange 3 of the cylinder for the purpose to be described.

Prior to assembly of the rod in the cylinder body, the washer 9 is passed along the rod from the free end thereof to a position adjacent the head 8. The device 10 and attached boot are then passed along the rod in similar manner until the device engages the washer. This sub-assembly can then be mounted in the cylinder body by press-fitting the device 10 into the open end of the body and this retains the rod assembly with sufficient security for transit of the cylinder prior to it being finally secured in its position of use on the support 4. When it is desired to secure the cylinder in such position, the rod and boot, together with the smaller diameter cylindrical portion 12 of the retention device are passed from the left through an opening 4A in the support and bolts 5 are then used to bolt the cylinder body to the support. It will be seen that, once the cylinder is so secured, the surface 15 of the retainer 10 is engaged against the fixed bulkhead 4 and any return loads exerted on the push rod by external pedal return springs and/or internal piston return springs are reacted via the retainer 10 onto the fixed bulkhead. This arrangement is advantageous in that it enables the strength of the existing bulkhead to be used in order to react, via the relatively flimsy retainer 10, substantial forces arising as aforesaid on the force input rod.

FIG. 2 shows the invention applied to a fabricated master cylinder in which the cylinder body 1 is a drawn metal tube. The open end of the tube is flared at 1A to receive the large cylindrical portion 11 of a retainer 10 similar to that of FIG. 1 and the remaining details of construction and assembly of the device 10 are similar to those described above except that the boot 14 is of the type through which the rod 7 slides and is shaped to form a rod wiper 14A.

It will be seen that the invention provides a pressure cylinder in which the inherent strength of the mounting support is used to react the substantial rod return forces and enables a relatively simple and inexpensive rod retainer to be used, such retainer being also advantageously employed as a boot securing means. The embodiments described are particularly advantageous in that they enable the rod 7 and its retainer to be assembled in the cylinder body 1 and the assembled cylinder to be subsequently installed by an assembler working entirely from one side of the mounting support 4. Assembly of the cylinder on to a vehicle is thus facilitated and the cylinder assembly may be readily stored and transported prior to use in a vehicle.

Various modifications to the shape and disposition of the components described may be made within the scope of the present invention. It would be possible, for example, to interpose a thrust insert of hardened material between the surface 15 of the device 10 and the support 4 so that the device 10 no longer directly engages the support and would be inset within the cylinder to accommodate the insert. In a further alternative arrangement, the cup-shaped retainer 10 may be dispensed with and the washer 9 arranged to abut directly against the support 4 for transmission of said forces sustained by the rod.

We claim:

1. A pressure cylinder, comprising:

a cylinder body containing a piston in one direction by a generally coaxial force input rod; and rod retention means carried by the cylinder, said rod retention means have a first cylinrical portion engaged within an open end of the cylinder body, a transverse wall portion providing, at one side thereof, and axially outwardly facing surface arranged such that, when the cylinder is mounted on a thick support, said axially outwardly facing surface abuts a surface of said support, and opposite side of said transverse wall portion being engageable, within the area of said axially outwardly facing surface, by means movable with the rod, whereby forces susutanied, in use, by the rod in a direction opposed to the actuating force input direction thereof are transferred by a said rod retention means onto the fixed support.

2. A pressure cylinder according to claim 1, wherein said transverse wall portion of the rod retention is connected to a second cylindrical portion of the rod retention means having a smaller diameter than said first cylindrical portion thereof and projecting axially outwardly of the cylinder body so as to extend, in use, through an opening in said support.

3. A pressure cylinder according to claim 2, wherein a shoulder is formed between said first and second cylindrical portions of said rod retention means for constituting said transverse wall portion thereof.

4. A pressure cylinder according to claim 1 wherein the retention means supports a protective boot for the rod.

5. A pressure cylinder according to claim 1 wherein said second portion is fixed to a protective boot for the rod.

6. A pressure cylinder according to claim 4 wherein the protective boot is moulded on to the retention means.

7. A pressure cylinder according to claim 5 wherein said second portion has a radially projecting part and the protective boot is moulded on to said second portion around the radially projecting part which serves to key the retention means to the boot.

8. A pressure cylinder according to claim 1 wherein a washer surrounds the rod within the retention means and transmits said forces to said retention means.

9. A pressure cylinder according to claim 1 wherein a washer surrounds the rod within the retention means and transmits said forces to said shoulder.

* * * * *